July 5, 1927.
G. CHRISTIA ET AL
1,634,454
WHEEL
Filed Aug. 28, 1926
2 Sheets-Sheet 1
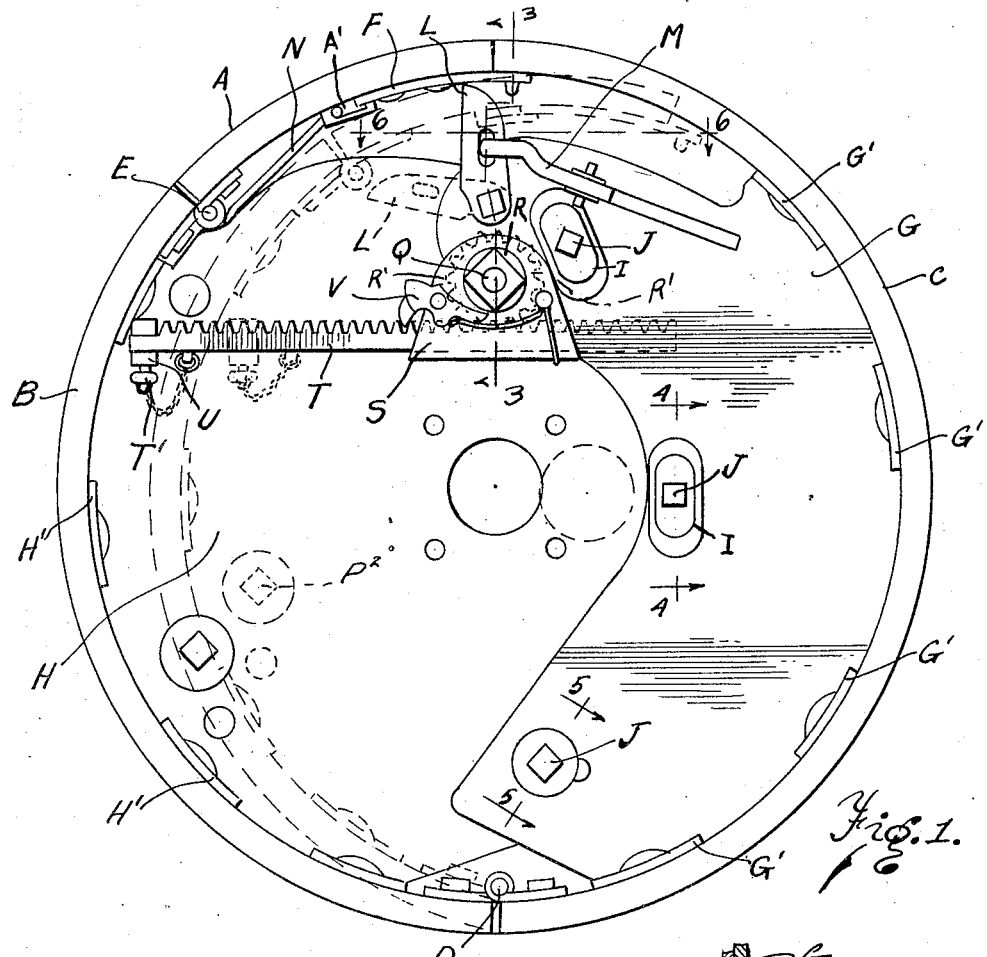
Fig. 1.
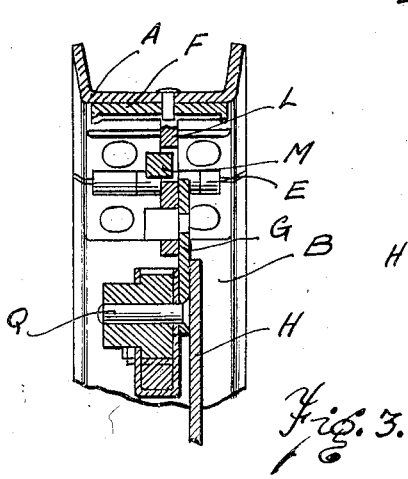
Fig. 3.
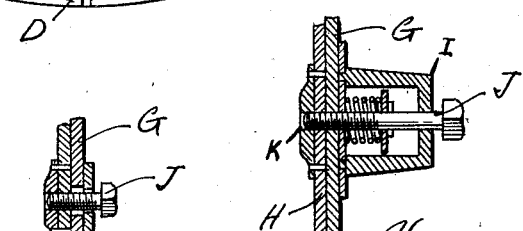
Fig. 5.
Fig. 4.
INVENTORS
George Christia
Peter Christia
BY William M. Ewan
ATTORNEY.

July 5, 1927. 1,634,454

G. CHRISTIA ET AL
WHEEL
Filed Aug. 28, 1925  2 Sheets-Sheet 2

INVENTORS
George Christia
Peter Christia
BY
William M. Elwan
ATTORNEY.

Patented July 5, 1927.

1,634,454

UNITED STATES PATENT OFFICE.

GEORGE CHRISTIA AND PETER CHRISTIA, OF DETROIT, MICHIGAN.

WHEEL.

Application filed August 28, 1926. Serial No. 132,053.

This invention relates to collapsible rim construction for motor vehicle wheels particularly of the web or disc type, and has for its object an improved organization of parts by means of which the wheel may either be held in truly circular peripheral form for road running or may be easily collapsed from the inner face of the tire when the removal of the latter is desired, as for example in case of a puncture.

In the drawings:

Figure 1 is an elevational view of one side or face of the wheel structure.

Figure 3 is a detail edge elevational view of the rim and certain of the locking elements, taken along the line 3—3 of Figure 1 and looking in the direction of the arrows there shown.

Figure 4 is an enlarged sectional elevational view of one of the web-locking members, taken along the line 4—4 of Figure 1 and looking in the direction of the arrows there shown.

Figure 5 is an enlarged sectional elevational view of another one of the web-locking members taken along the line 5—5 of Figure 1 and looking in the direction of the arrows there shown.

Figures 2, 6:
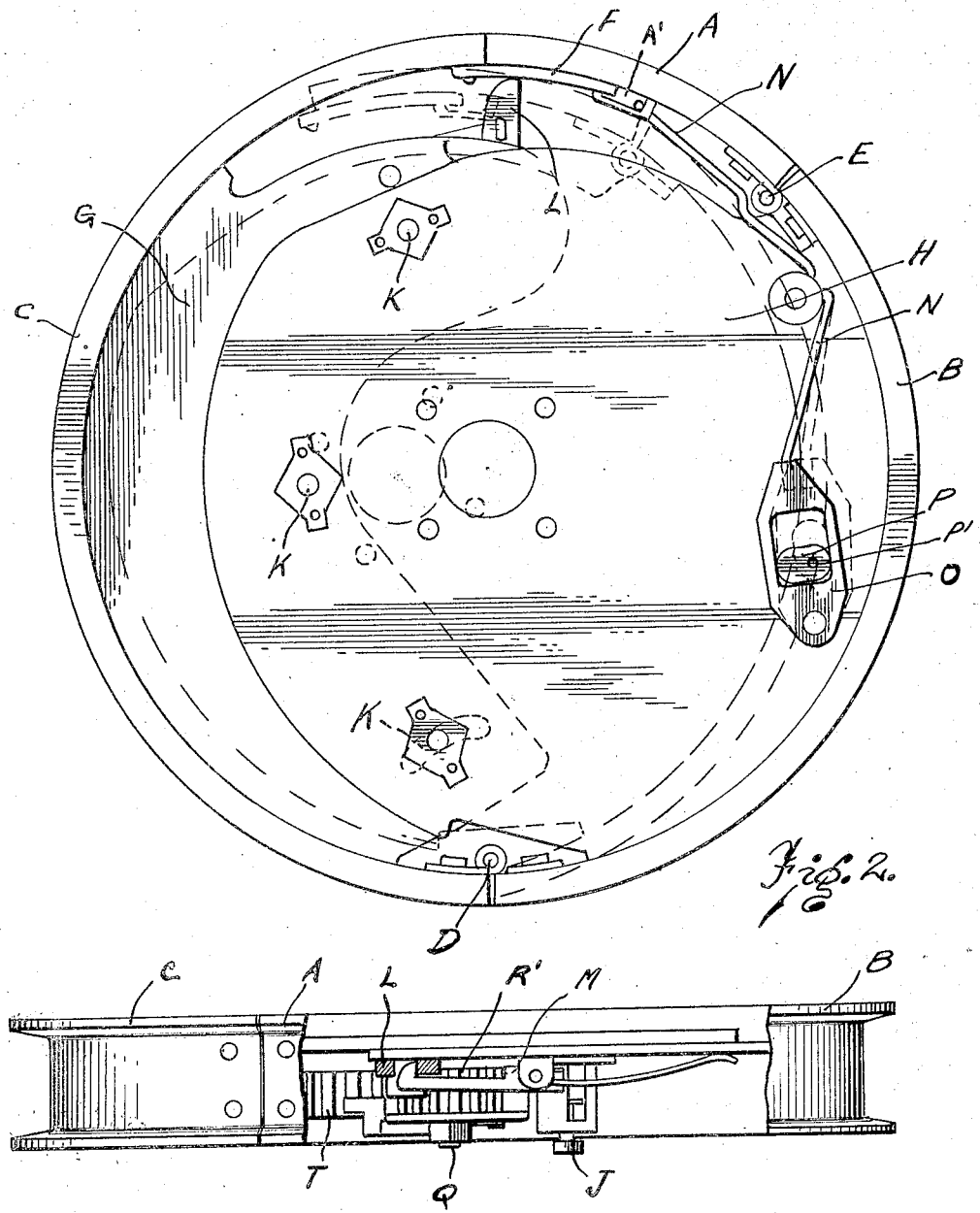
Figure 2 is a similar view of the other face.
Figure 6 is an edge view of the wheel and rim taken from above the position of Figure 1, with a portion of the rim centrally broken away to permit the illustration from this position of certain of the locking parts located just beneath or inside of the rim.

A, B and C indicate rim sections which are pivotally united at certain of their meeting ends by hinges D and E. The unhinged end of the rim section A has fixed to it a short reinforcing plate F, one end of which extends beyond the end of the rim section A and under the adjacent end of the rim section C. Fixed to the inner faces of the rim sections B and C, as by riveted flange ears H' and G' respectively, are a pair of web members G and H, which lie in sufficiently different planes so that their inner edge portions can overlap one another. When the rim parts are in truly circular or fully extended position, the spring-projected holding bolts J, which are preferably mounted in small frames or cages I on the web piece G, are in alignment with correspondingly positioned screw-threaded holes K in the web H, and when passed therethrough serve to lock the web parts and their corresponding rim sections in the extended and truly circular position desired for smooth road running of the wheel. To care for the adequate support of the otherwise free end of the rim section A, to which the plate F is fixed, there is pivoted to the adjacent portion of the web G a dog or cam piece L, which may be locked into holding position with respect thereto by the spring catch M.

It is obvious that variations in the type of bolt used to correlate the two web members G and H could easily be indulged in without departure from the fair scope of our disclosure: for example, the spring-projected bolt J, shown in Figure 4 and indicated in Figure 1. is one by the action of whose spring is normally drawn upward as soon as it has been unscrewed sufficiently for its threading to be clear of the threading in the lower (in Figure 4, the left hand) plate H of the wheel web. In Figure 5, on the other hand, the plain threaded bolt J', which is not spring-drawn, is shown as an alternative and additional securing means for holding the two web parts in proper relative position. Of course when the web parts are moved to further overlapping position by being swung about the pintle of the hinge D, neither type of locking bolt functions, nor could any otherwise equivalent form of bolt function thus.

Pivotally supported on that face of the web H which is shown in Figure 2, is a spring N, one end of which is bent at right angles, transversely of the plane of the web or disc member H, so as to lockingly engage in the pocket A' on the under face of the rim section A, adjacent the reinforcing plate F, while its opposite end is attached to the otherwise free end of the centrally apertured pivoted lever O, in which wipingly engages the cam piece P, which is mounted on one end of the pivot or short shaft P' carrying the nut P², which may be turned with a wrench or pliers to effect the rotative actuation of the cam piece P and consequently the swing of the pivoted lever O and its connected spring N.

Also mounted on the web or disc G quite near the dog L is a stud or shaft Q, over which may be slipped the correspondingly sized sleeve R, which is peripherally formed with gear teeth R', and which rotatably engages in the frame or shell S, through and from one end of which projects the ratchet bar T, which structure, with its spring-held locking dog V, may be compared with a lifting jack, and may indeed be wholly removed from the wheel structure when the latter is in road use; the outer end of the ratchet bar T engages between bracket ears U supported by the web section H, and is removably anchored thereto by the removable pin or key T'.

The operation of this device is as follows: When for any reason it is desired to contract the peripheral extent of the wheel rim, the latch piece M is sprung to release the dog L, so that it may be manually swung to the position shown in dotted lines in Figure 1, and the cam-carrying shaft P' is turned through a quarter turn to terminate the holding tension of the spring N, thus enabling the hinged rim piece A to fall away from its peripheral alignment with the rim sections B and C. The spring-projected studs or bolts J on the web G are then retracted so that their ends no longer engage through the holes K in the web or disc piece H. The dog V is then released from its engagement with the teeth of the ratchet bar T and the sleeve R is rotated by means of pliers or a wrench, resulting in the rotation of the ratcheted periphery R' against the teeth of the ratchet bar T. Since the free end of this ratchet bar is anchored to the web H through the medium of the bracket ears V and pin T, while the sleeve R engages about the stud Q which is fixed in the web section G, this results in drawing the rim sections B and C together, about the hinge D as a pivot, thus contracting the wheel's periphery adequately to free the face of the rim from the inner face of the tire. When the tire is ready for replacement on the rim, the expansion and firm locking of the latter is accomplished by a reversal of the order of the steps above described.

What we claim is:

1. In a disc wheel, in combination with a plurality of hingedly correlated rim sections, web portions appurtenant to two of said sections, means for locking said web sections in extended position relatively to one another, means for locking the third rim section in peripheral alignment with the adjacent portions of the other rim sections, and means for regulatably moving said webs and their corresponding rim sections inwardly and outwardly when said locking means are inactive.

2. In a disc wheel, the combination, with a plurality of segmental rim sections, hinge connections for all but one of the pairs of meeting ends thereof, partially overlapping web plates connected with two of said rim sections, means for regulatably effecting the inward and outward swing of two of said rim sections and their attached web sections about one of said hinges as a pivotal center, means for locking said web plates and their corresponding rim sections in extended position, and means for supporting the third rim section in peripheral alignment with the adjacent ends of the other rim sections when the latter are in extended position.

3. In combination with a plurality of hingedly correlated rim sections, partially overlapping web members appurtenant to two of said rim sections, means supported by one of said web sections whereby the third rim section may be locked in position of peripheral alignment with the other rim sections when the latter are in extended position, means for locking said web members and their corresponding rim sections in extended position, and means operatively connected with each of said web members whereby they and their attached rim sections may be actuated inwardly and outwardly when said last named locking means have been rendered inactive.

4. In combination with a plurality of hingedly correlated rim sections, web members appurtenant to two of said rim sections, said web members extending only a portion of the way across the space normally bounded by said rim members and lying in diverse planes whereby they may be moved limitedly inward and outward in parallel planes, means for locking in extended position the unhinged meeting ends of the rim sections, means for regulatably moving said web sections relatively to one another, thereby actuating their respective rim sections inwardly or outwardly accordingly, and means for locking said web sections and consequently their respective rim sections against further relative movement when the rim sections have attained their full peripheral position.

5. The combination, with a pair of marginally overlapping web sections, of means for locking them in extended relation, a rim section appurtenant to each of said web sections, a hinge member pivotally correlating the meeting ends of said rim sections, a third rim section hingedly connected with the free end of one of said first-named rim sections, means for holding the free end of said last named rim section and the adjacent free end of one of the first named rim sections in desired circular alignment, and means for regulatably moving said web sections and their corresponding rim sections toward and away from the extended truly circular position of the latter.

In testimony whereof, we sign this specification.

GEORGE CHRISTIA.
PETER CHRISTIA.